Nov. 24, 1942.  W. J. SACKETT  2,303,140
BAG FILLING AND WEIGHING MACHINE
Filed April 4, 1939  2 Sheets-Sheet 1
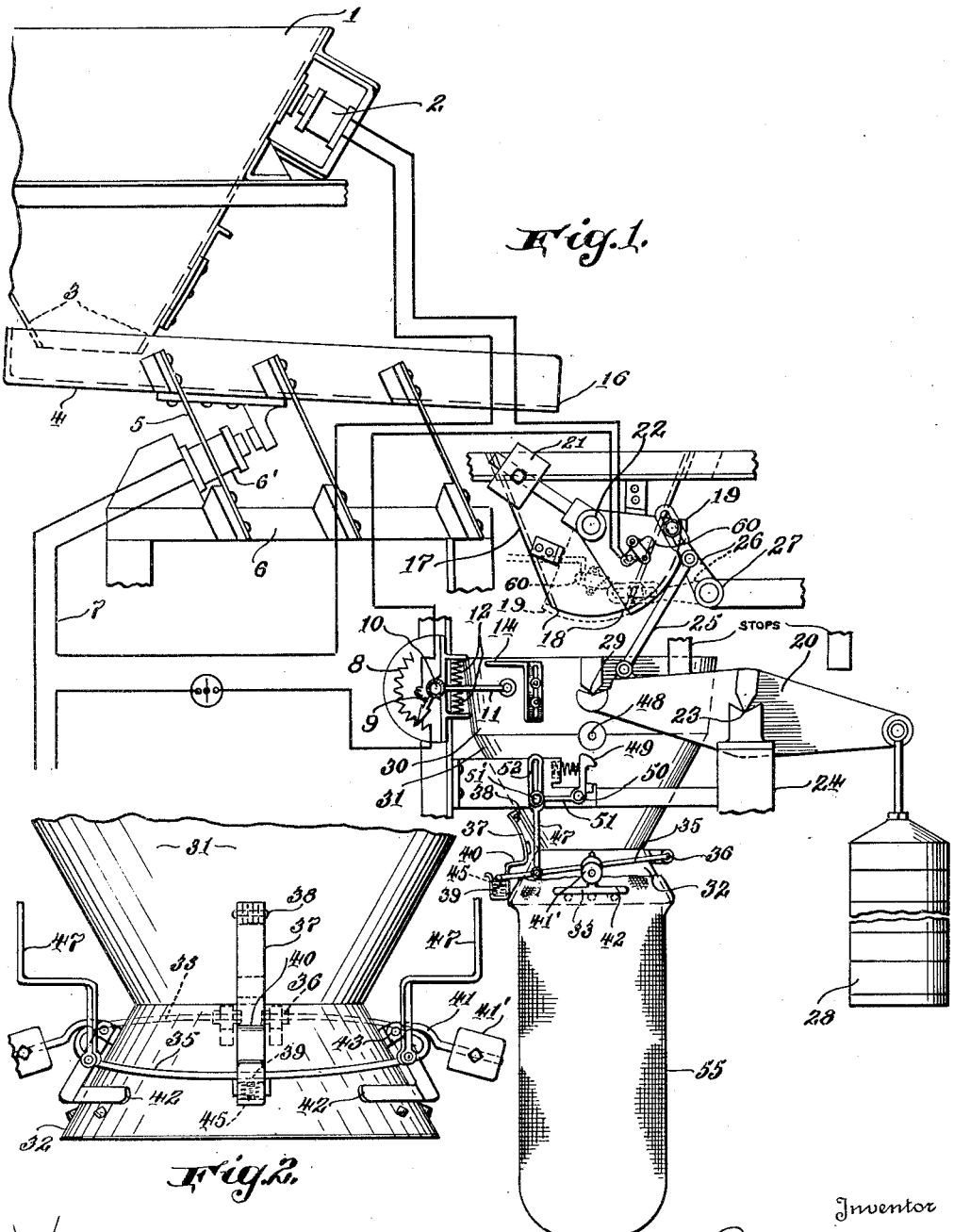

Nov. 24, 1942.　　　W. J. SACKETT　　　2,303,140
BAG FILLING AND WEIGHING MACHINE
Filed April 4, 1939　　2 Sheets-Sheet 2

Inventor
Walter J. Sackett
By Edwin F. Samuels
Attorney

Witness

Patented Nov. 24, 1942

2,303,140

UNITED STATES PATENT OFFICE 2,303,140

BAG FILLING AND WEIGHING MACHINE

Walter J. Sackett, Baltimore, Md., assignor to The A. J. Sackett & Sons Company, Baltimore, Md., a corporation of Maryland Application April 4, 1939, Serial No. 265,891

11 Claims. (Cl. 249—60)

The invention relates to an automatic bag filling and weighing apparatus, particularly adapted to the bagging and weighing of fertilizer materials. Such materials differ widely from dry free flowing materials, such as granulated sugar, and the various grains, in that they are strongly inclined to clog and bridge so that they cannot be fed freely by pouring and when accumulated as in a hopper they become lodged and cannot ordinarily be moved without human intervention.

The prior art machines which perform the bag weighing and filling operation transfer the material from a bin to a hopper in which hopper the material has a tendency to accumulate at the end of each weighing operation. In this hopper it tends to bridge and clog interfering with each successive weighing operation and requiring special attention in each instance. The machines in use are slow and only adapted to free flowing materials.

The object of the present invention is to provide a bag weighing and filling machine which operates at a relatively high speed being, except for the detachment and clamping of the bag, fully automatic, handling materials like fertilizer which tend to mat and bridge. This machine accomplishes more accurate weighing than can be done by hand in the time allowed for this operation in handling fertilizer and avoids delays due to the matting and bridging of the accumulated quantities of material being handled including particularly materials which tend to clog on account of lack of fluid qualities.

The machine of the invention comprises an automatic feeding device, the flow from which is controlled by a valve which gives a cut off which is essential to precise weighing. To avoid accumulation the automatic feed is controlled as to its operation and also preferably as to its speed by the position of the weighing elements which is in turn controlled by the weight of the load in the bag so that the feeding takes place only in correspondence with weighing and in the preferred type of machine slows down as the end of the weighing operation approaches, further contributing to the uniformity and accuracy of the weighing operation, by avoiding over feeding due to momentum, and making it easier to control the cut off.

I have disclosed a preferred and modified form of the apparatus both of which forms respond to the foregoing outline, the essentials of the machine being different mainly as to the type of feed by which the material is transferred from the bin to the weighing apparatus.

In both forms of apparatus, the material is dropped vertically from the automatic feed into the bag the valve being in the same vertical line and the funnel used mainly to guide deflected material and serving no hopper function, the valve being used merely to cut off the flow of the material, the feed having ceased at the end of the weighing so that there is practically no accumulation.

In the drawings, I have illustrated both known forms of the machine:

Fig. 1 is a diagrammatic elevation of a representative apparatus including a vibratory feeding table.

Fig. 2 is a fragmentary view of the bag supporting, distending and clamping mechanism, the funnel and the bag support, the same being drawn to an enlarged scale as compared to Fig. 1.

Figures 3, 4:
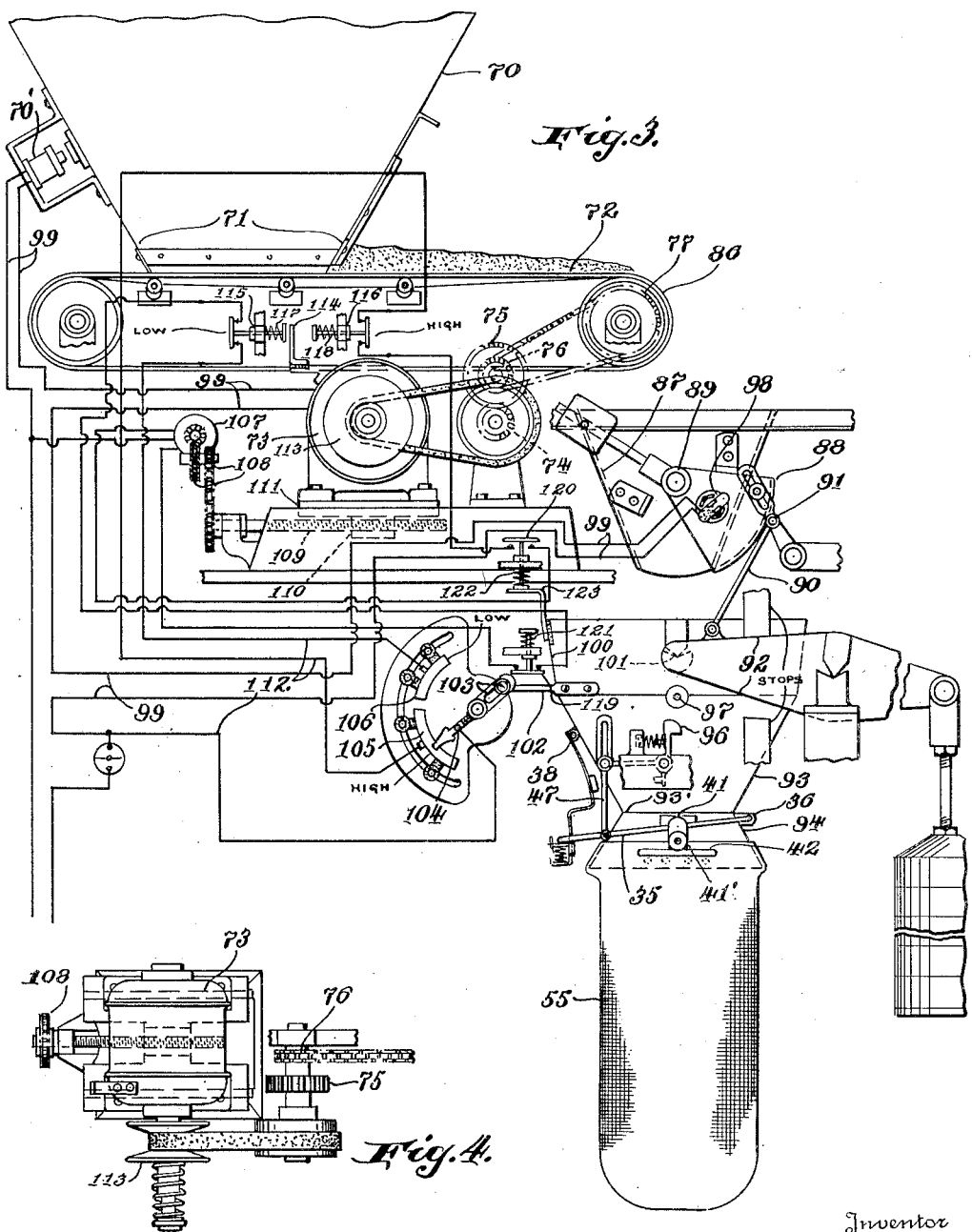
Fig. 3 is a diagrammatic side elevation of the apparatus in the preferred form, a belt feed being substituted for the vibratory feed.
Fig. 4 is a fragmentary plan view of the electric motor, variable speed drive and a portion of the reducing gear for driving the conveyor belt as shown in Fig. 3.

Referring to the drawings by numerals, each of which is used to indicate the same or similar parts in the different figures, Figs. 1 and 2 being first described on account of the relatively simple diagrammatic illustration of the vibratory feed which is substituted for the belt in the preferred form. This construction as shown comprises a bin 1, the continuous flow from which is maintained by means of a vibrator 2, it being understood that any suitable source of supply and agitator may be substituted for the bin 1 and the vibrator 2. As shown, the bin 1 is open at the bottom at 3, and there is an inclined table 4 beneath the opening 3, the same being downwardly inclined to the right in Fig. 1. This table 4 in the form of the invention shown is supported on leaf springs 5 secured in any suitable manner to a stationary frame 6 and extending upwardly therefrom on an incline to the left as illustrated, or in any suitable manner. In the form of the invention shown the table is vibrated by a vibrator 6' of the solenoid type energized by a circuit 7 which also energizes the vibrator 2.

The intensity of the current in the circuit is in turn controlled by a resistance 8, the extent of the resistance included in this circuit being regulated by contact arm 9, which is pivoted at 10 and operated by crank arm 11 which projects to the right from the pivot 10 being held in and returned to normal position by springs 12. The arm 11 and thence the contact arm 9 are moved by a moving abutment 14 which moves as the weighing operation progresses in a manner to be described.

In operation the material being weighed falls directly from the forward lower end 16 of the table 4, the deflected portions being guided by a chute or funnel 17 which is substantially straight and has a large bottom opening at 18. This chute is controlled by an arcuate valve 19 which is in turn connected to and controlled by the scale beam 20. The valve 19 is counterbalanced at 21 and pivoted at 22.

The scale beam is mounted on a stationary support 24 being pivoted on a knife edge 23 in accordance with the usual practice. This scale beam is connected to the valve 19 by means of a connecting rod 25, connected to the beam at one end and at its other end to an arm 26 which is pivoted on the frame at 27, and connected to valve 19 to operate the valve.

The scale beam is counterbalanced by means of a weight 28 on one side, and at its other end it carries pivotly mounted on knife edges 29 a depending funnel 31 at the lower end of which is a depending bag holding skirt 32 which cooperates with a bag clamp 33 shown in detail in Fig. 2.

The moving abutment 14 as already described is mounted on the short cylinder 30 which forms upper end of the funnel and the current in the circuit 7, i. e., the intensity of the same and hence the intensity of the vibration is gradually cut down as the end of the weighing operation approaches. This is due to the movement of the contact arm 9 over the contact arc 8 incident to the downward motion of crank 11 responding to pressure of abutment 14.

The valve 19 operated by scale beam 20 carries a mercury switch 60, see Fig. 1, which controls the circuit 7 to stop and start the vibratory table 4. At the end of the weighing operation, the shifting of the valve 19 from open to closed position operates the mercury switch 60 cutting off the current and stopping the vibration of the table 4 so that the supply of material is discontinued almost simultaneously when the bag is filled and the beam drops. The closing of the valve contributes to accuracy of weighing but results in no harmful accumulation because of the simultaneous stopping of the feed actuating means and hence of the vibratory feeding mechanism.

There is no harmful accumulation of material between the weighing, the valve 19 being employed mainly to catch the material which may drop after the vibration stops, it closes when the beam tips giving precision without accumulation. Accuracy as well as speed is of great importance, and the combination of the mechanical feed, the belt of Fig. 3 being preferred, and the valve between the dropping points of the feed and the bag funnel, both the feed and the valve being controlled by the weighing beam, the two operating in combination, are of primary importance in their contribution to the highly improved result attained. The automatic reduction of the speed of the feeding member is also regarded as contributing to the accuracy attained in handling this material.

The bag clamp 33 in the form shown, which is subject to considerable variation in the broader conception of the invention, includes a releasing ring 35 which is pivoted at 36 in a boss mounted in a suitable bracket on the skirt 32 as best shown in Fig. 1. This ring or hoop 35 is elevated and supported in the inoperative position of the clamp on a hook 37 which is pivoted on the funnel 31 at 38 and has a depending seat 39 outwardly beyond the support 40 which holds the ring in said inoperative position of the clamp. The ring 35 has a releasing function. The clamping operation is performed by weighted arms 41 having clamping feet 42, the weights being indicated as 41', said arms being pivoted on the skirt 32 at 43 of the bag opening and supporting member or funnel.

The clamping arms 41 are duplicated as many times as may be regarded as helpful and the ring 35 engages under all these arms in the manner shown near the weights or in any suitable manner so that when the ring 35 is raised the clamping feet 42 are held in released position. The hoop or ring 35 being at this time supported on the supporting surface or step 40 of the hook 37. The depending seat 39 is provided with a spring support 45 and the ring 35 is connected to tension control rods 47.

The combined cylinder 30 and funnel 31, which, for convenience, will be referred to in a general way as a funnel guides the material into the bag and carries the skirt 32 to which the bag is clamped and by which the bag is supported on the scale beam. This funnel is provided with a projecting locking pin 48 which moves with the beam and engages a spring actuated hook 49 pivotly mounted on a stationary portion of the machine frame at 50. The top of the hook is inclined as shown so that when the funnel 31 moves downwardly with the beam at the end of the weighing operation, the hook 49 is deflected by the pin 48 and when the pin 48 moves further downwardly to a slight degree the funnel 31 and the scale beam 20 are locked in depressed position at the end of the weighing operation. The hook 49 as shown has a bell crank arm 51 which engages in a slot 52 in the rod 47 and this rod or bar 47 will have moved downwardly to a considerable extent at the end of the weighing operation bringing pin 51' near the upper end of the slot.

When weighing has been completed the scale beam being thus locked the filled bag is released and dropped by raising the ring 35 which releases the clamping feet 42, and a new bag is slipped over the skirt 32 and clamped, by the ring 35 being dropped to permit the feet 42 to engage the bag. At this time the pivoted hook 37 will be moved to the right in Fig. 1 displacing support 40 from beneath the ring and permitting the ring to rest in the depressed seat 39 on the spring 45.

When the bag, which is indicated by reference character 55, has been clamped the ring 35 is pressed downwardly. The point of the engagement of the arm 51 being in the upper end of the slot 52, the arm 51 is pushed downwardly rocking hook 49 and releasing the pin 48 so that the beam swings upwardly to initial weighing position as shown and the apparatus is ready for a second weighing operation. The crank arm 11 is likewise released and the contact arm 9, controlled by springs 12, is caused to move to the full intensity position on the contact segment so that the full speed vibratory action begins, starting the feed from the bin to the table, the table being already loaded with the material, feeding begins instantaneously.

As previously pointed out, the vibratory action of the table 4 is gradually reduced by the reduction of the intensity of the current in the circuit 7 as the end of the weighing operation is approached and at the end of the weighing operation, due to the action of the moving abutment 14 on the cylinder 30 which is integral with funnel 31 and bag support or skirt 32, all of which members move with the beam in the weighing operation being supported on the scale beam 20, whereby abutment 14 operates contact arm 9 through arm 11 reducing the current and the vibratory action of the table gradually slows down as the load is completed. At this time the table vibration is stopped by the operation of switch 60 which moves with the beam and the valve 19. The valve 19 also being controlled by the scale beam 20, the valve 19 shuts off at the end of the weighing operation and on account of the simultaneous cessation of the feed, there is practically no accumulation of material.

Also it will be noted that the end of the table 4 at 16 is directly over the bag and the funnel 31 has a comparatively large opening, has its sides nearly vertical, so that the material discharged from the table during the filling operation falls without interference directly into the bag and there is no opportunity for accumulation and hence no opportunity for bridging or clogging.

While Figs. 1 and 2 have been first described, the construction shown in Fig. 3, portions of which are identical with Figs. 1 and 2, has been built and successfully operated and is regarded as the preferred form of the invention.

Referring to Fig. 3, I have shown a bin 70 having a discharge opening 71 by which fertilizer or similar material is dropped on a conveyor belt 72, this conveyor belt is operated by a variable speed drive including an electric motor 73 and a set of reducing gears 74 to 77, the latter directly connected to the drive pulley 86 which drives the belt 72. A Reeves drive is shown and is regarded as a satisfactory variable speed drive for this purpose. The discharge end of the belt 72 is directly over a chute 87 which is closed by a valve 88 which is pivoted at 89 and connected by means of a connecting rod 90 and a lever 91 to a weighing beam 92 which supports a funnel 93 having a wide discharge opening 93' and substantially upright sides. The funnel 93 has at its bottom end a bag supporting skirt 94 with a bag clamp 35 as in the previously described construction. There is also a hook 96 on the frame and pin 97 carried by the funnel and hence by the beam to operate after the manner of the hook 49 and pin 48 in the previous construction. The valve 88 is also provided with a mercury switch 98 which controls the circuit 99 including the motor 73 and hopper vibrator 70' and other electrical apparatus to be described.

The funnel 93 as shown has a top cylindrical portion 100 supported on the scale beam 92 as by means of knife edge 101, carries an arm 102 which operates by a pin and slot connection 103, the swinging contact arm 104 which moves over contact segments 105 and 106 which are adapted to control the speed changing motor 107 through the circuit 112 shown. There is an adjusting motor 107 in the circuit 112 which is of the reversing type controlled by the contact segments 105 and 106 respectively, changing of the contact arm 104 from one segment to the other reverses the motor 107. The motor 107 is connected by reducing gears 108 to a worm 109, which is connected by a suitable nut 110 to the base 111 of the motor 73, whereby the driving motor may be shifted and the speed of the Reeves drive controlled in accordance with the well known operation of this type of mechanism for effecting definite changes of speed of the pulley 86 and hence the speed of the belt 72.

The mercury switch 98 mounted on valve 88 controlled by the beam 92 serves to start and stop motor 73 and hence the feed belt 72 and also the vibrator 70' and the feed of the material from the bin 70 when the valve is open or closed.

With particular reference to Fig. 3 of the drawings, the Reeves drive structure 113, and the motor drive therefor indicated at 73, are provided with electrical control means, through the circuit 112, whereby the forward and rearward movements of the motor 73 and its attendant Reeves drive structure is limited in a predetermined manner which movements are caused by the actuation of the small remote control motor 107, its gear drive 108, worm and nut members 109 and 110 respectively. As the time period of electrical contact between the pivoted arm 104 and the respective segment members 105 and 106 will vary due to the variable fluid or flow characteristics of different kinds of material to be weighed and bagged, it is important to provide means to stop the actuation of the remote control motor 107 upon the Reeves drive and motor 73 after they have been moved to either the extreme forward or the extreme rearward position for high and low speed driving of the conveyor belt 72. In this respect the motor 73 is provided with an upwardly extending bracket or abutment member 114, which engages the respective yielding switch units 115 and 116 at its maximum forward and rearward positions, breaking the circuit 112, and the change speed movement of the motor 73, thereby permitting the motor 73 to continue to drive the conveyor belt 72 at either maximum high or low speeds until the weighing structure reaches a position requiring a change of speed or stoppage of the conveyor belt 72.

The switch units 115 and 116 in the circuit 112 are normally held in closed position by their respective spring members 117 and 118, thereby allowing the Reeves drive to shift back and forth from high to low gear at intermediate positions through the actuation of the remote control motor 107.

For purposes of preventing the continued actuation of the remote change speed control motor 107 after the weighing apparatus has moved to its maximum low position at the end of the weighing operation and its maximum high position at the initial weighing position, cut off yielding switch units 119 and 120 are provided in the circuit 112 both normally held in closed position by their respective spring members 121 and 122 during the intermediate movements of the weighing apparatus.

The top cylindrical portion 100 of the funnel 93 is provided with a horizontally extending bracket or switch abutting member 123 as shown, for purposes of causing the opening of said switches upon contacting their respective yielding head portions at the said high and low positions of the weighing apparatus. The opening of the upper switch unit 120 at the initial weighing position provides means whereby the remote control motor 107 is prevented from actuating the Reeves change speed gearing until the conveyor belt drive motor 73 is in full operation for purposes of allowing for proper sequence of operation of these elements.

In view of the description of the operation of the apparatus previously presented, the operation of this apparatus will be easily understood. The scale beam is held down at the end of the weighing operation by means of the hook 96 which provides for the engagement of an empty bag in place of a filled one, the bag being released and removed as described in connection with Fig. 2. When the new bag has been attached the ring 35 is depressed in the manner previously described and the funnel and scale beam are then released for the weighing operation.

The contact arm 104 controls the speed of the feed belt by controlling the Reeves drive by way of motor 107 whereby the belt is slowed down at the end of the weighing operation the same being started at the beginning of the weighing operation at full speed due to control of contact arm 104 by the beam.

The mercury switch 98 closes and opens the circuit 99 controlling the driving motor at the beginning and end of the weighing operation respectively. The supply of the material to the funnel 93 therefore coincides exactly with the weighing operation and there is no opportunity for accumulation while the small amount of material which falls from the feed belt 72 after the breaking of the circuit at the switch 98 is intercepted by the valve 88, this is not sufficient to permit any accumulation of material which would cause clogging or bridging. It is also of importance that the end of the belt 72 being directly over the bag or funnel 93, which has a large opening 93' sufficient to drop the material directly into the bag at high speed, there is no opportunity whatever for accumulation and hence no opportunity for bridging. It is also important that, as in the previous apparatus, the delivery of the material is slowed down at the end of the weighing operation so that there is no tendency whatever to overrun, hence weighing is performed not only automatically but with extreme uniformity and accuracy.

I have thus described the preferred and a modified form of my weighing apparatus, the description being specific and in detail in order that the manner constructing, applying, operating and using the invention may be fully understood, however, considerable variation in detail is contemplated within the scope of the invention, the specific terms being used descriptively rather than in a limiting sense, and the scope of the invention being defined in the claims.

What I claim as new and desire to secure by Letters Patent is:

1. In a machine for filling bags and similar receptacles, a combined bag clamp and bag mouth funnel, a weighing unit with means supporting the bag clamp thereon in weighing relation. a mechanically operated feeding device, adapted to advance the material to a point of dropping, means for operating the feed and means for stopping and starting the feed, said means for stopping and starting the feed being connected to the weighing unit to be controlled thereby to start and stop the feed at the beginning and end of the weighing operation, means for controlling said feed operating means to change the rate of feed, said controlling means being connected to said weighing unit to reduce the feed proportionately to and with the completion of the weighing operation, a second funnel between the point of dropping said material and said bag mouth funnel, and a valve controlling the passage of material through said second funnel and means connecting said valve to the weighing unit whereby said valve is automatically closed at the end of the weighing operation and opened at the beginning of said operation.

2. In a machine for filling bags and similar receptacles, a combined bag clamp and funnel, a weighing unit adapted to support the bag clamp in weighing relation, a mechanically operated feeding device, adapted to advance the material to a point of dropping, means for operating the feed, means for stopping and starting the feed and means whereby the same is connected to the weighing unit to be controlled thereby to start and stop the feed at the beginning and at the end of the weighing operation, controlling means for reducing speed of the feeding device as the weighing operation progresses and means operating said controlling means from the weighing unit, a second funnel between said point of dropping and said bag mouth funnel and spaced above said bag mouth funnel, a valve in said second funnel serving when closed to prevent passage of material therethrough and mechanical means connecting said valve to the weighing unit to close the valve as weighing is completed and to open it at the beginning of the weighing operation.

3. The combination in a bag filling machine having a bag mouth distending and clamping device, a scale beam supporting the same, a mechanical feed with power means for operating the same, the feed having a discharge vertically aligned with and over the bag distending device and means controlled by the motion of the scale beam for stopping the feed operating device at the end of the weighing operation when the bag is full and starting the same at the beginning of the weighing operation, said latter means including a locking device for holding the scale beam in a depressed position corresponding to the full bag and means connected to the bag clamp and to the lock and adapted to release the lock permitting the beam to rise when a new bag has been clamped in receiving position.

4. The combination in a bag filling and weighing apparatus of means for clamping a bag mouth and holding it extended and upwardly disposed, a weighing unit supporting the same, a mechanical feed including a conveyor belt having a point of dropping over the mouth of the clamped bag and in vertical alignment with the same, a valve between the point of dropping and the mouth of the clamped bag, a funnel spaced above said mouth clamp and converging toward said valve which valve closes said funnel, means controlled by the weighing unit for opening the valve at the beginning of the weighing operation and closing the same at the end of the weighing operation, means for driving the power feed at a predetermined speed at the initial introduction of material into the bag, and controlling means for said feed drive, connected to the weighing unit to reduce the speed of said feed as weighing progresses.

5. The combination in an apparatus for filling and weighing bags, means for maintaining a supply of material, mechanical means for feeding said material to a point of dropping and power means for operating the feed, the feed having a discharge point where the material is dropped, a scale beam, a valve beneath said discharge, a funnel beneath the valve and mounted upon a scale beam, means for clamping a bag in receiving relation to the funnel, the valve and the funnel being in vertical alignment with the discharge, means connecting the valve to the scale to be operated thereby to hold the valve open at the beginning of the weighing operation and to close the same at the end of the weighing operation, and means for controlling the operation of the feed, the same being connected to the scale, whereby the feed is started at the beginning of the weighing operation and stopped at the end of the weighing operation, automatic means for locking the weighing unit at the end of the weighing operation, holding the valve closed and the feed in inoperative position, means for releasing and engaging the bag clamp and means for releasing the lock, the lock releasing means being connected to the clamp engaging and releasing means to release the lock only when the bag clamp has been reengaged with a new bag to be filled.

6. The combination, in an apparatus for filling and weighing bags, of a scale, a power feed for feeding material, a source of power for operating the same, the feed having a discharge point where the material is dropped, a valve beneath said point of dropping and a funnel extending down to and closed by said valve, means for supporting a bag mouth on the scale in weighing relation thereto and beneath the funnel, means connected to the scale to be operated thereby to hold the valve open at the beginning of the weighing operation and to close the same at the end of the weighing operation, means also connected to the scale for starting the feed at the beginning of the weighing operation and stopping the same at the end of the weighing operation, means for reducing the speed of said feed and means connected to said scale for controlling said reducing means to reduce the speed of the feed as the weighing operation progresses to completion.

7. The combination in a bag filling and weighing apparatus, of means for clamping a bag mouth and holding it extended and upwardly disposed, a weighing unit supporting the same in weighing relation to said unit, a mechanical feed having a point of dropping over the mouth of the clamped bag and in vertical alignment with the same, a valve between the point of dropping and the mouth of the clamped bag, means controlled by the weighing unit for stopping the feed at the end and starting it at the beginning of the weighing operation, means connecting the valve to the weighing unit holding the valve open at the beginning of the weighing operation and closing it at the end of the weighing operation, means for changing and varying the rate of feed and means connected to the scale unit controlling said change to reduce the rate of feed as the weighing operation approaches completion, and a funnel in receiving relation to said point of dropping and closed by said valve, said funnel being spaced above said clamping and holding means to permit free motion of the latter in weighing.

8. The combination in a bag filling and weighing apparatus of means for clamping a bag mouth and holding it extended and upwardly disposed, a weighing unit supporting the same in weighing relation to said unit, a mechanical feed having a point of dropping over the mouth of the clamped bag and in vertical alignment with the same, a valve between the point of dropping and the mouth of the clamped bag, a funnel in line with said point of dropping and converging downwardly to said valve and adapted to be closed thereby, said funnel being spaced above the bag mouth holding means to permit free motion of the latter, means for driving the feed at a varying rate, controlling means for said feed connected to the weighing unit to reduce the rate of feed as the end of the weighing operation is approached, means controlled by the weighing unit for stopping the feed at the end of the weighing operation, and means for connecting the valve to the weighing unit holding the valve open at the beginning of the weighing operation and closing it at the end of the weighing operation.

9. The combination in a bag filling and weighing apparatus of a weighing unit, means for clamping a bag mouth and holding it distended and upwardly disposed with the bag supported in weighing relation to said unit, a feed belt having a point of dropping over the mouth of the clamped bag, power means for operating the feed, said feed having a change speed mechanism and means connected to the weighing unit to control said change speed mechanism reducing the rate of feed as the end of the weighing operation is approached, and means controlled by the weighing unit for stopping the feed at the end of the weighing operation, a valve between the point of dropping and the mouth of the clamped bag, means controlled by the weighing unit for holding the valve open at the beginning of the weighing operation and closing the same at the end of the weighing operation, a funnel controlled by said valve and in receiving relation to said point of dropping and below the same, said funnel being spaced upwardly from the bag mouth clamp to provide free motion of the latter in weighing.

10. The combination in a bag filling and weighing apparatus of a weighing unit, means for clamping a bag mouth and holding it distended and upwardly disposed with the bag supported in weighing relation to said unit, a power feed having a point of dropping over the mouth of the clamped bag, power means for operating the feed, a hopper supplying material to said feed and means for vibrating the hopper to advance the material therein toward the feed, a valve between the point of dropping and the mouth of the clamped bag, means controlled by the weighing unit for holding the valve open at the beginning of the weighing operation and closing it at the end of said operation, means connected to the weighing unit to be operated thereby for controlling the rate of feed to reduce the same at the end of the weighing operation, and a funnel controlled by said valve and spaced above and free of said distending means.

11. In a machine for filling and weighing bags of fertilizer materials, having a scale with a beam and means for supporting a bag in weighing relation to the scale with the bag mouth distended, electrically operated means for feeding the material said latter means having a discharge for dropping the material at a predetermined location above the distended bag mouth, means for leading the material downwardly from said location to the bag mouth and means for starting and stopping the feed at the beginning and at the end of weighing operation respectively comprising a gravity operated switch in the circuit of said electrically operated means, and a movably mounted valve member carrying said switch, said valve member being in the path of the material above the bag mouth and below said dropping location and being connected to a moving member of the scale to move in correspondence with the beam in weighing, whereby said valve is open at the beginning and closed at the end of the weighing operation and said switch is closed at the beginning and opened at the end of the weighing operation.

WALTER J. SACKETT.